Sept. 21, 1937. W. D. CLARK 2,093,907
SAFETY LIGHT REFLECTOR DEVICE
Filed Nov. 21, 1935
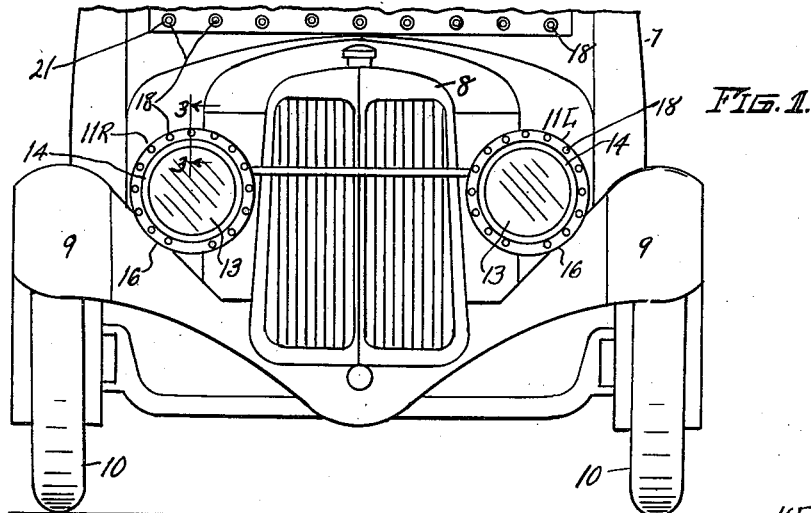
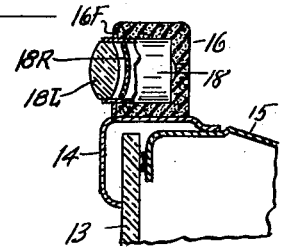
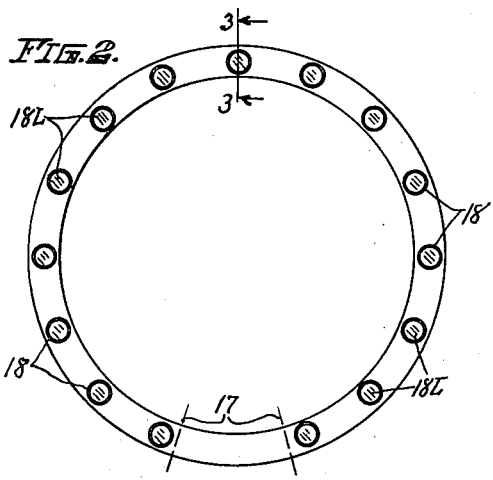
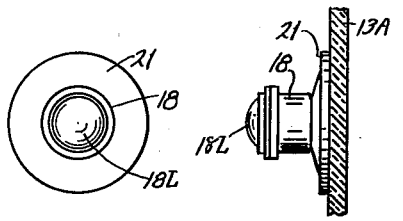
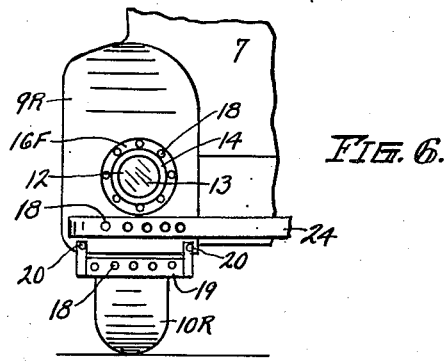
INVENTOR:
William D. Clark.
By David E. Carlsen
ATTORNEY.

Patented Sept. 21, 1937

2,093,907

UNITED STATES PATENT OFFICE 2,093,907

SAFETY LIGHT REFLECTOR DEVICE

William D. Clark, St. Paul, Minn.

Application November 21, 1935, Serial No. 50,888

2 Claims. (Cl. 88—81)

My invention relates to light reflector and safety indicating means adapted generally for a considerable number of uses but particularly adapted to use on motor vehicles. The device in various forms may be mounted on various parts of an automobile, its most useful positions being such as to reflect warning lights to occupants of other cars whether the latter are approaching it from ahead or behind.

Among the various useful purposes of my device an important one is the provision of light reflector buttons mounted to encircle head-light rims and similarly the tail-light of an automobile. This usefulness is accentuated when and if any or all of the headlight and tail-light bulbs for any reason become dark. Under all ordinary circumstances such absence of light is a road hazard involving extreme danger not only to occupants of the car but to others on the road. However with my simple danger indicating reflector devices, the presence and position of the darkened car on a highway is indicated by its light reflector means which are mounted in such positions as to be in the path of light projected by other cars on the highway and reflect said light as hereinafter fully set forth, reference being had to the accompanying drawing, in which:—

Fig. 1 is a front view of an automobile equipped with my emergency reflector means in a preferred form on its headlights. Fig. 2 is an enlarged front view of a reflector ring of the type shown in Fig. 1 and also as used on the rear lamp of a car as shown in Fig. 6. Fig. 3 is an enlarged approximately full size cross sectional detail of the reflector ring about as on line 3—3 in Figs. 1 and 2. Fig. 4 is a face view of a modified form of my reflector device embodying a rubber suction pad or disc and Fig. 5 is a side elevation of Fig. 4 showing it mounted on a glass surface. Fig. 6 is a rear view of the lower left end of an automobile showing my safety reflector means mounted in two ways.

Referring to the drawing by reference numerals, 7 designates an automobile body of any type and of which 8 is the radiator, 9 the front fenders, 10 the front wheels and 10R the rear wheels, 11R and 11L the right and left headlights, respectively, and 12 is the so-called parking and tail-light. 13 is the usual head-light lens removably retained within a metal ring or rim 14 concentric of the open end of the headlight drum 15.

In the preferred use of my device I provide a ring 16 which may be of quadrangular form in cross section and mounted circumferentially on the outer face of rim 14 of a headlight or tail light lamp as the case may be, said ring when thus mounted having a forwardly exposed face 16F in about common plane with the lens 13 and concentric thereof. The ring 16 may be entirely or nearly all of sponge rubber of suitable elasticity but formed preferably with a portion of its lower part, as between lines 17 in Fig. 2, of considerable elasticity. In the making of this ring it may be normally of considerably less inside diameter than the outside diameter or circumference of the rim 14 and when being mounted on the latter is simply expanded by stretching it until it can be slipped on the rim 14 in the position designated, the released ring contracting and adhering to the rim 14. It will be readily understood that the ring 16 may also be of more solid material and suitably fixed concentrically on the head light rim.

In the front face 16F of the ring 16 I provide a number of so-called reflector buttons preferably of a type well known in the display art and each comprising a metal cylinder 18 in one end of which is retained a lens 18L exposed forwardly of the face 16F. Obviously these buttons must be retained in suitable bores or pockets in the ring and may further be retained by cement or other means. 18R (Fig. 3) is a metallic reflector within the button, back of the lens. In the use of solid rings 16 the buttons may be otherwise suitably and removably mounted.

In any of the ring devices it is preferable to have a continuous row of the reflectors, see Figs. 1 and 2, the spacing being optional but preferably regular.

In Fig. 6 the same construction of reflector signal means above described is shown applied to a tail light, or so-called parking light provided at the rear end of motor vehicles, the only difference being that all parts involved are relatively smaller than for the headlights. Further, in said Fig. 6, I have illustrated a reflector device comprising a bar or elongated plate 19, suitably retained as at 20 to the lower edge portion of the fender and exposing rearwardly a number of the reflector buttons 18.

In Figs. 4 and 5 the reflector button is a unit independent of the ring 16, the button instead being secured centrally to a rubber suction cup member 21 securable to any surface such as glass 13A which latter glass may be also the lens of the headlight. It may be practical for example on large types of headlights to place a circular row of the reflector devices such as shown in Figs. 4 and 5 adjacent to the inner edge of the ring 14 on the lens 13. Another optional arrangement of the suction cup types is shown in Fig. 1 where a row of them are affixed to the lower face of the windshield.

From the above description the use of my safety reflector means will be readily understood. However, an example of its utility would be in order, namely as follows:

Assuming that in driving a car equipped as illustrated, during night driving, one headlight and the tail light bulbs for any reason should become inoperative, there would then of course be no rear light of warning to other car drivers approaching from the rear and only one headlight, directed toward oncoming cars or cars about to pass. If it should be the left headlight that is out of commission the drivers of approaching cars would of course see only the one operative light and would not know positively if there were ample clearance for passing.

However, the ring of reflector buttons on the left head-lamp will reflect light from the headlights of the approaching car and will readily be seen by the driver of said car and collision be avoided.

Likewise the reflectors on the tail-light lamp will similarly warn drivers of cars approaching from the rear. This refers also to the reflectors on bar 19 near the lower rear edge of the left rear fender 9R. Colored lenses in the reflector buttons are optional for rear end use particularly it being perhaps preferable to have one color of reflectors at the rear end of a car and another color at the front, or as may be required by law in some localities. Clear glass lenses are preferred.

In Fig. 6, 24 represents either a front or rear bumper of an automobile, or any type of auxiliary bumper, in the outer face of which is secured or imbedded a number of the reflectors 18.

I claim:

1. A safety reflector device for automobile lamps having a lens retaining ring, a lens therein in common plane with the ring, and means for projecting light therethrough; said device comprising an elastic annular band of quadrangular shape in radial section, a row of light reflectors mounted in said band and exposed at one side thereof, said band adapted to be expanded to be placed circumferentially on said lamp ring to engage frictionally on said ring by contraction.

2. A safety reflector device of the class described comprising a one piece annular band of flexible non-elastic material throughout the major portion thereof, the balance of the band consisting of elastic material, a row of light reflectors mounted in said band and exposed at one side thereof, the band being adapted to be expanded circumferentially of the rim of a motor vehicle lamp and to be retained thereon by contraction of the band on said rim.

WILLIAM D. CLARK.